(No Model.) 2 Sheets—Sheet 1.

S. BLUMENTHAL.
APPARATUS FOR MEASURING AND WINDING RIBBON.

No. 550,741. Patented Dec. 3, 1895.

Witnesses:
George Barry.
W. B. Seward.

Inventor
Sidney Blumenthal
by attorneys
Brown & Seward (No Model.) 2 Sheets—Sheet 2.
S. BLUMENTHAL.
APPARATUS FOR MEASURING AND WINDING RIBBON.
No. 550,741. Patented Dec. 3, 1895.
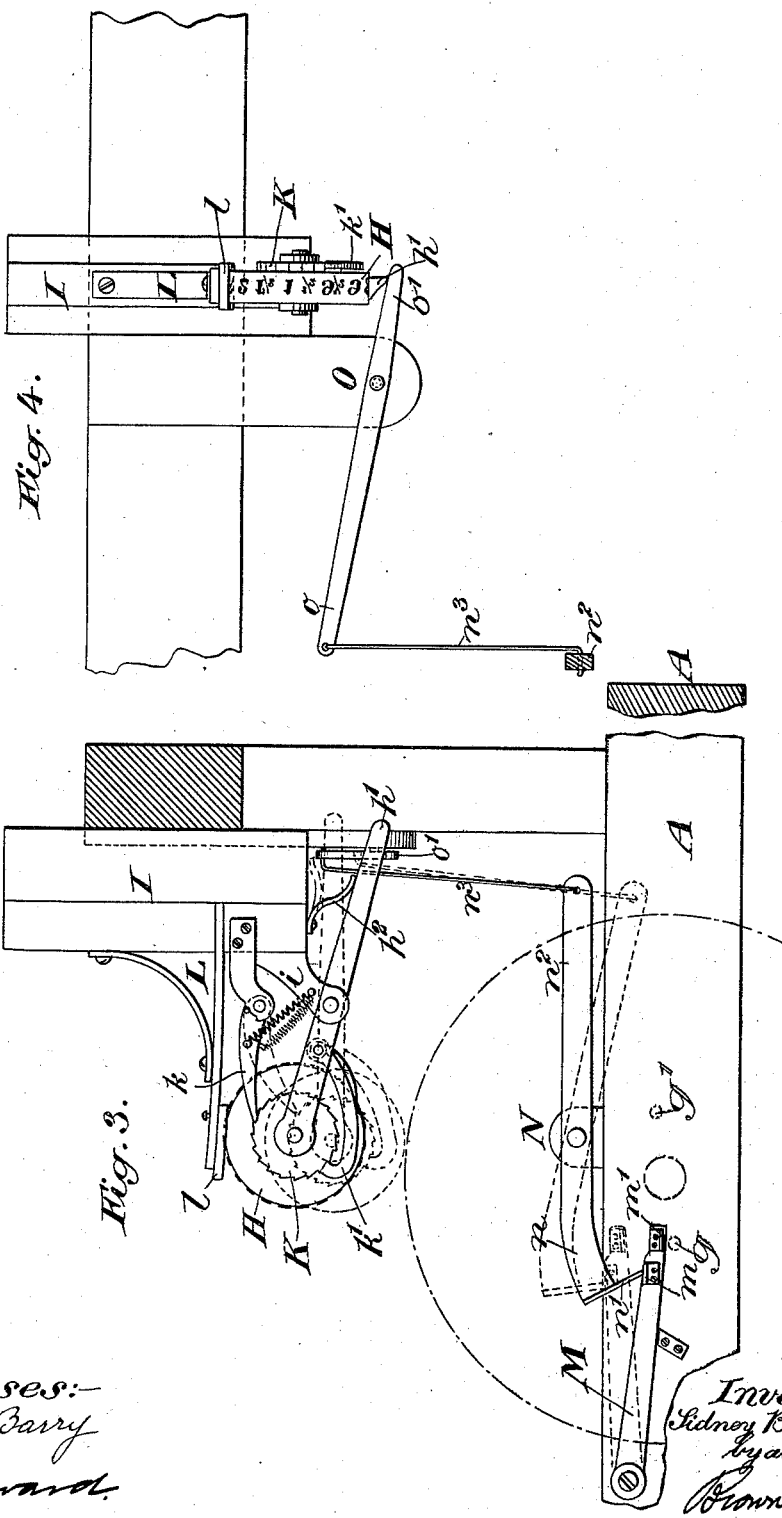
Witnesses:—
George Barry
Inventor:—
Sidney Blumenthal
by attorneys

UNITED STATES PATENT OFFICE.

SIDNEY BLUMENTHAL, OF NEW YORK, N. Y.

APPARATUS FOR MEASURING AND WINDING RIBBON.

SPECIFICATION forming part of Letters Patent No. 550,741, dated December 3, 1895.

Application filed January 24, 1895. Serial No. 535,989. (No model.)

*To all whom it may concern:*

Be it known that I, SIDNEY BLUMENTHAL, of the city and county of New York, in the State of New York, have invented a new and useful Improvement in Apparatus for Winding and Measuring Ribbon, of which the following is a specification.

My invention relates to an improvement in apparatus for winding and measuring ribbon, the object being to provide means for carrying out this invention which will accurately measure the ribbon as it is wound with the ribbon-paper into rolls, from which pieces of varying lengths are to be cut off and sold.

A further object is to provide a device which will be very simple in construction, yet positive in action, and one which may be easily set up ready for use.

A practical embodiment of my invention is represented in the accompanying drawings, in which—

Figure 1:
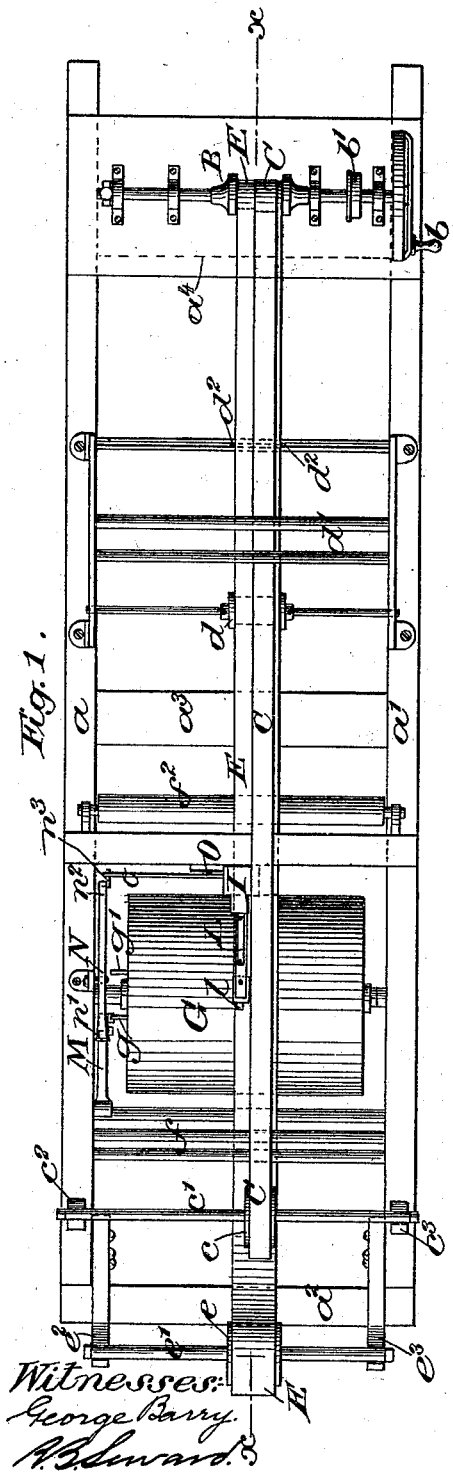
Figure 2:
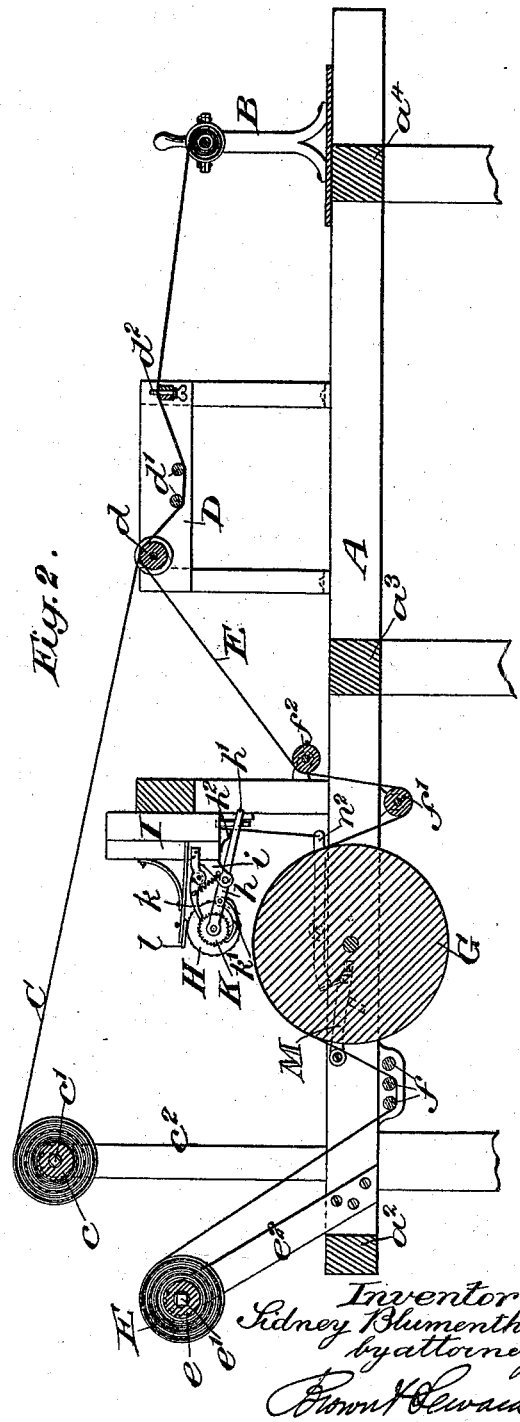

Figure 1 is a top plan view of the apparatus, showing the position of the several parts thereon. Fig. 2 is a longitudinal central vertical section upon line $x\,x$ of Fig. 1. Fig. 3 is an enlarged detail side view of the printing-stamp mechanism and its operating parts, the position of the measuring-roll being indicated in dotted lines; and Fig. 4 is a front view of a portion of the said mechanism.

A designates a suitable bed-frame, upon which the several working parts of the apparatus are mounted, and it preferably consists of two longitudinally-extending side pieces $a\,a'$, spaced apart by cross-pieces $a^2$, $a^3$, and $a^4$.

B represents the winding mechanism, which winds up the ribbon and the ribbon-paper together as they are fed from their supports. This winding mechanism may be of any well-known or approved form and is operated either by a handle $b$, or it may be driven by a belt upon a suitable band-pulley $b'$, if found more desirable.

C designates the ribbon, which it is desired to wind, and it is mounted upon a drum or spool $c$, through which a spindle or shaft $c'$ extends. This spindle or shaft is mounted to rotate in suitable supports $c^2\,c^3$. The spool $c$, having the ribbon C thereon, may be located anywhere along the spindle or shaft $c'$, as desired, so as to feed properly to the winding mechanism B. The ribbon C is caused to unwind under suitable tension by passing it over and under suitable tension-rolls on its way to the winding mechanism B. In the present instance I have passed this ribbon over a friction-pulley $d$ and under friction-rollers $d'$ and then over a suitable guide $d^2$, all mounted in a suitable support D upon the bed-frame A.

E designates the ribbon-paper, which is adapted to be wound, together with the ribbon C, by the winding mechanism B. This ribbon-paper E is mounted upon a suitable spool or drum $e$, which has a spindle $e'$ extending therethrough. This spindle is mounted to rotate in suitable supports $e^2\,e^3$, preferably at the rear of the apparatus. This ribbon-paper E is caused to engage a number of friction-rollers and pulleys on its way to the winding mechanism B, so that it may be drawn under the proper tension by the said winding mechanism as the ribbon and ribbon-paper are wound up thereon. Besides engaging the pulley $d$, friction-rollers $d'$, and guide $d^2$ upon the support D the ribbon-paper also engages suitable friction-rollers $f$, $f'$, and $f^2$.

The measuring mechanism through which I pass the ribbon-paper on its way from its support to the winding mechanism is described as follows: I mount a suitable measuring-roll G in the bed-frame A, so as to rotate therein. I preferably locate this measuring-roll between the friction-roll $f$ and the friction-roll $f'$ and pass the ribbon-paper E partially around the exterior of the said measuring-roll G. The advance movement of the ribbon-paper as it is wound up by the winding mechanism B will, because of its engagement with the measuring-roll G, cause it to rotate without allowing the ribbon-paper E to slip thereon. I mount a suitable printing-stamp above the measuring-roll G and in position to engage the ribbon-paper upon said roll at intervals as the ribbon is advanced, the said printing mechanism being under the control of the measuring-roll.

The printing mechanism which I have shown in the accompanying drawings consists of a suitable type-wheel H, mounted to rotate in a suitable rocking supporting-arm $h$, which allows the type-wheel to be swung toward and away from the face of the measuring-roll G. The rocking supporting-arm $h$ is secured to a suitable bracket $i$ upon a supporting-frame I, which uprises from the bed-frame A.

The means which I have shown for rotating the type-wheel H one step at a time, so as to present a new type to the ribbon-paper upon the printing-roll G each time the said printing-stamp is swung up and down, is as follows: I secure a suitable ratchet-wheel K upon the same shaft upon which the type-wheel H is mounted, said ratchet-wheel being adapted to rotate with the said type-wheel. Two spring-actuated pawls $k$ $k'$ engage the teeth upon the said ratchet K in such position that when the type-wheel H is depressed the upper pawl $k$, which is mounted upon the support I, is allowed to slip a tooth, and as the type-wheel H is returned to its normal position away from the measuring-roll G the said pawl $k$ will force the type-wheel H around one step, thereby presenting a new type in position to print upon the ribbon-paper E. The type upon the type-wheel H are inked by a suitable inking mechanism secured to the support I, which inking mechanism in the present instance consists of a suitable bracket L, having an inking-pad $l$ thereon.

The printing-stamp mechanism is held normally away from the face of the measuring-roll G by means of a suitable spring $h^2$, which engages a rearwardly-extending portion $h'$ of the rocking supporting-arm $h$. As the roll G is rotated I bring the printing-stamp mechanism down upon the surface of the ribbon-paper at intervals by the following mechanism: Upon the side of the bed-frame A, I mount a reciprocating arm M, having engaging-plates $m$ $m'$, the plate $m'$ being located in the path of suitable pins $g$ $g'$ upon the measuring-roll G, so that as the said pins engage the plate $m'$ they will raise the reciprocating arm M. I further secure a two-armed rocking lever N to the bed-frame A, one arm $n$ of the said lever having a downwardly-extending portion $n'$, which at all times engages the plate $m$ upon the reciprocating arm M. The other arm $n^2$ of the two-armed lever N is connected to an arm $o$ of a two-armed lever O by a suitable rod $n^3$, the other arm $o'$ of the said two-armed lever O being so located as to engage the rearwardly-extending portion $h'$ of the rocking supporting-arm $h$. It will thus be seen that as the pins $g$ or $g'$ engage the plate $m'$ and raise the reciprocating arm M the type-wheel H is forced down into position to print upon the ribbon-paper E and as the pins $g$ or $g'$ release their engagement with the said plate $m'$ the type-wheel H is swung back away from the ribbon-paper E by the spring $h^2$. In the present instance I have shown the mechanism so arranged that every half-yard of ribbon wound upon the winding mechanism B will be measured by stamping the amount upon the ribbon-paper; but of course by changing the number of pins $g$ $g'$, &c., this mechanism may be used to print every yard or any other desired length.

As thus constructed, the apparatus will accurately print upon the ribbon-paper the number of yards wound by the winding mechanism B, and after the roll of ribbon and ribbon-paper has been wound and removed from the machine any number of yards or half-yards may be easily cut from the roll by simply unwinding the required number of yards, as indicated plainly upon the ribbon-paper.

By this apparatus I can wind any width or length of ribbon or ribbon-paper together with equal facility.

It is obvious that slight changes might be resorted to in the construction and operation of the several parts herein described without departing from the spirit and scope of my invention. Hence I do not wish to limit myself strictly to the structure herein set forth; but

What I claim is—

1. In combination, a support for the ribbon, a support for the ribbon paper, a winding mechanism for winding up the ribbon and ribbon paper together, suitable guide and tension rolls, a measuring roll partially around which the ribbon paper passes, which paper causes the roll to rotate as it is advanced, and a printing stamp under the control of the roll for printing distances on the ribbon paper as the roll is rotated, substantially as set forth.

2. In combination, a support for the ribbon, a support for the ribbon paper, a winding mechanism for winding up the ribbon and ribbon paper together, a measuring roll engaged by the ribbon paper and rotated by the advance movement of the ribbon paper, a printing stamp comprising a type wheel and an inking device, under the control of the roll for stamping distances upon the ribbon paper at intervals and means under the control of the measuring roll for rotating the type wheel at intervals, substantially as set forth.

SIDNEY BLUMENTHAL.

Witnesses:
B. B. SEWARD,
FREDK. HAYNES.